United States Patent
Kim et al.

(10) Patent No.: US 10,562,277 B2
(45) Date of Patent: Feb. 18, 2020

(54) RESIN FILM FOR LAMINATED GLASS, AND LAMINATED GLASS AND PREPARATION THEREOF

(71) Applicant: SKC CO., LTD., Suwon-si, Gyeonggi-do (KR)

(72) Inventors: Kyu-Hun Kim, Seoul (KR); Jewon Yeon, Suwon-si (KR); Sung Jin Chung, Seoul (KR); Heung Sik Kim, Seoul (KR); Hyejin Kim, Suwon-si (KR); Hak Soo Lee, Suwon-si (KR)

(73) Assignee: SKC CO., LTD., Suwon-si (KR)

( * ) Notice: Subject to any disclaimer, the term of this patent is extended or adjusted under 35 U.S.C. 154(b) by 0 days.

(21) Appl. No.: 16/008,604

(22) Filed: Jun. 14, 2018

(65) Prior Publication Data

US 2018/0361714 A1  Dec. 20, 2018

(30) Foreign Application Priority Data

Jun. 15, 2017 (KR) ........................ 10-2017-0075644

(51) Int. Cl.
- *B32B 17/10* (2006.01)
- *B32B 37/18* (2006.01)
- *C09J 159/00* (2006.01)

(52) U.S. Cl.
CPC .. *B32B 17/10761* (2013.01); *B32B 17/10036* (2013.01); *B32B 17/10577* (2013.01); *B32B 17/10688* (2013.01); *B32B 17/10954* (2013.01); *B32B 37/182* (2013.01); *B32B 17/10596* (2013.01); *B32B 17/10935* (2013.01); *C09J 159/00* (2013.01)

(58) Field of Classification Search
CPC ........ B32B 17/10036; B32B 17/10577; B32B 17/10596; B32B 17/10761; B32B 2307/102

See application file for complete search history.

(56) References Cited

U.S. PATENT DOCUMENTS

| | | |
|---|---|---|
| 2016/0159997 A1 | 6/2016 | Yui et al. |
| 2017/0157898 A1 | 6/2017 | Nakayama et al. |
| 2017/0217132 A1 | 8/2017 | Iwamoto et al. |
| 2018/0029335 A1 | 2/2018 | Kong et al. |

FOREIGN PATENT DOCUMENTS

| | | |
|---|---|---|
| CN | 105452350 | 3/2016 |
| CN | 105939980 | 9/2016 |
| DE | 10 2017 107 823 A1 | 2/2018 |
| KR | 10-2017-0066278 A | 6/2017 |

*Primary Examiner* — Ramsey Zacharia
(74) *Attorney, Agent, or Firm* — Sughrue Mion, PLLC

(57) ABSTRACT

Embodiments relate to a resin film for laminated glass, laminated glass comprising the resin film, and a process for manufacturing the laminated glass. The resin film for laminated glass comprises a resin layer comprising a polyvinyl acetal resin and a contact surface in direct contact with glass, wherein the contact surface has an Rz roughness of 25 to 90 μm and a maximum static friction coefficient at 20° C. of 0.85 to 1.60, and the compressive elastic deformation index measured in the perpendicular direction from the contact surface at 35° C. is 40 to 310 μm/N.

14 Claims, 4 Drawing Sheets

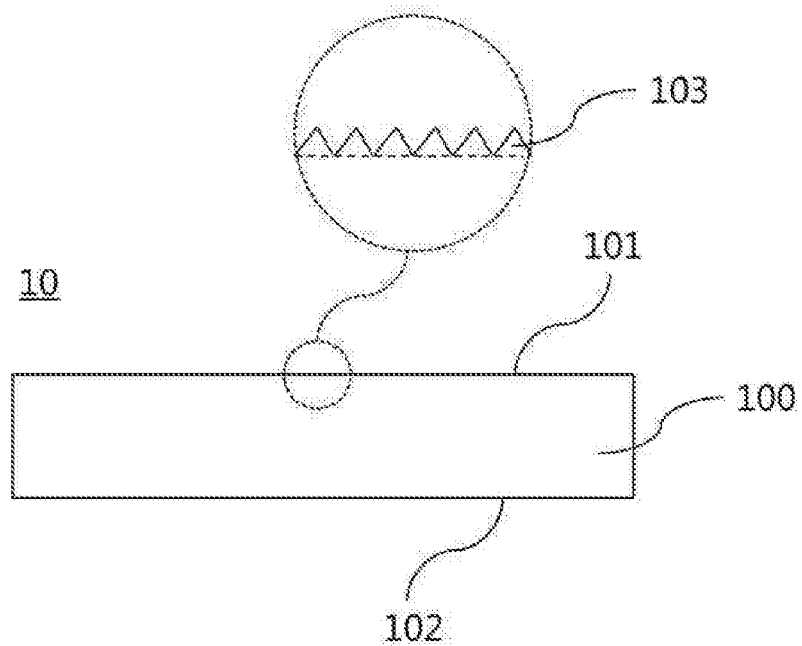
[Fig. 1]

[Fig. 2]
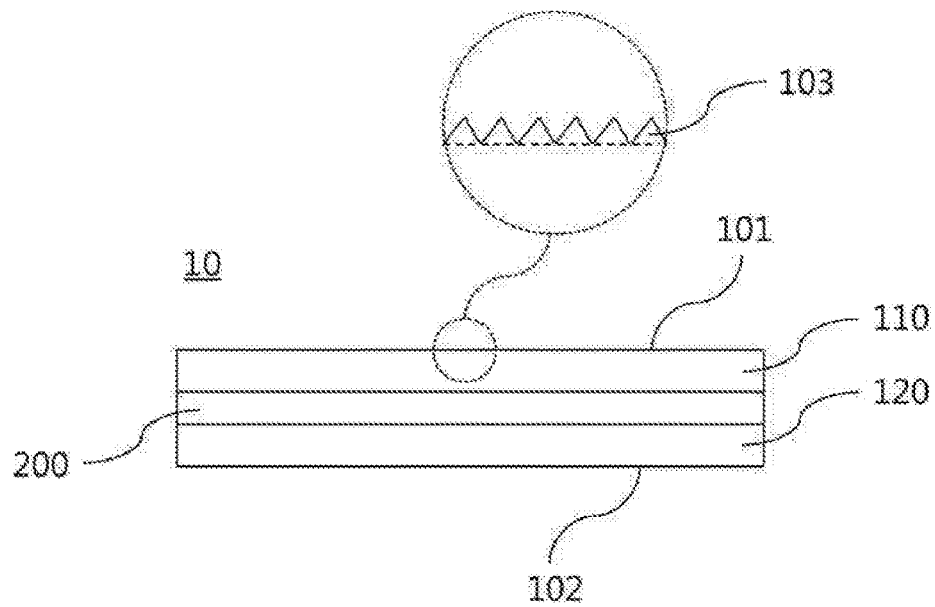
[Fig. 3]
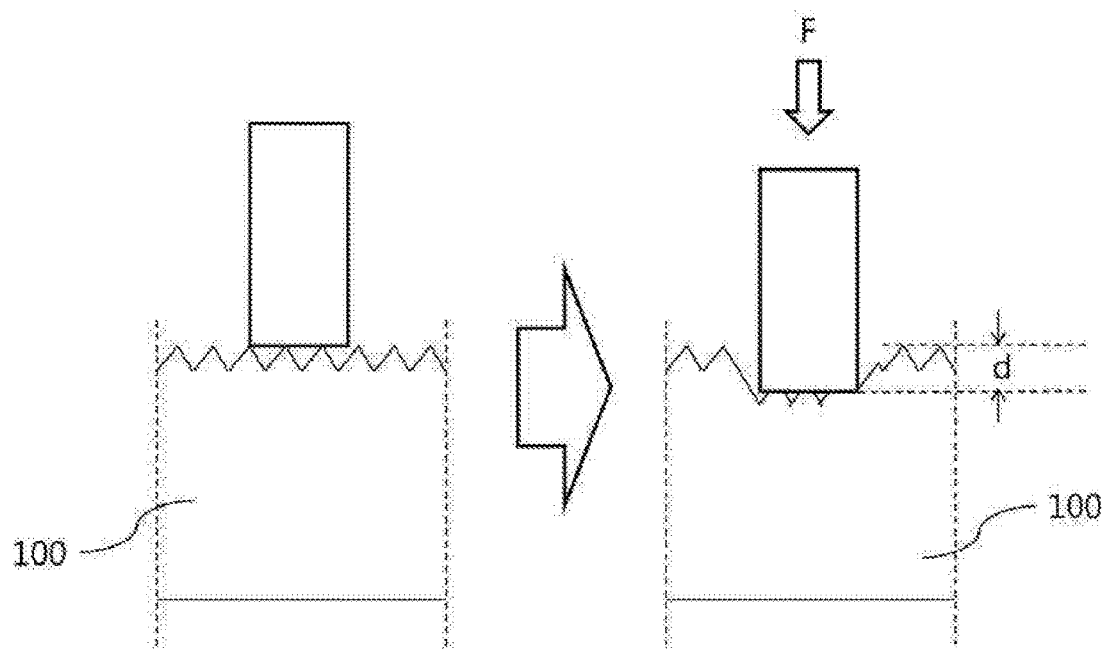

[Fig. 4]
[Fig. 5]
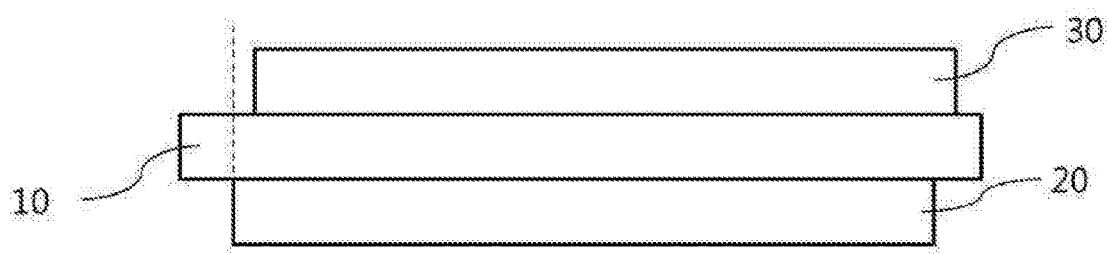
[Fig. 6]
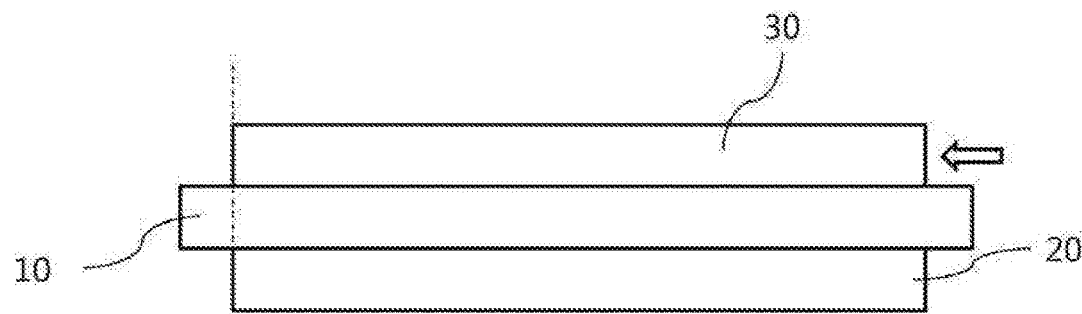
[Fig. 7]
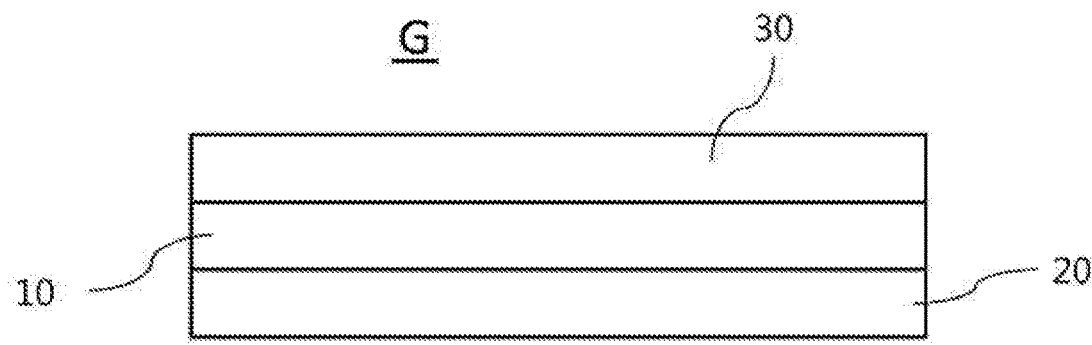

[Fig. 8]
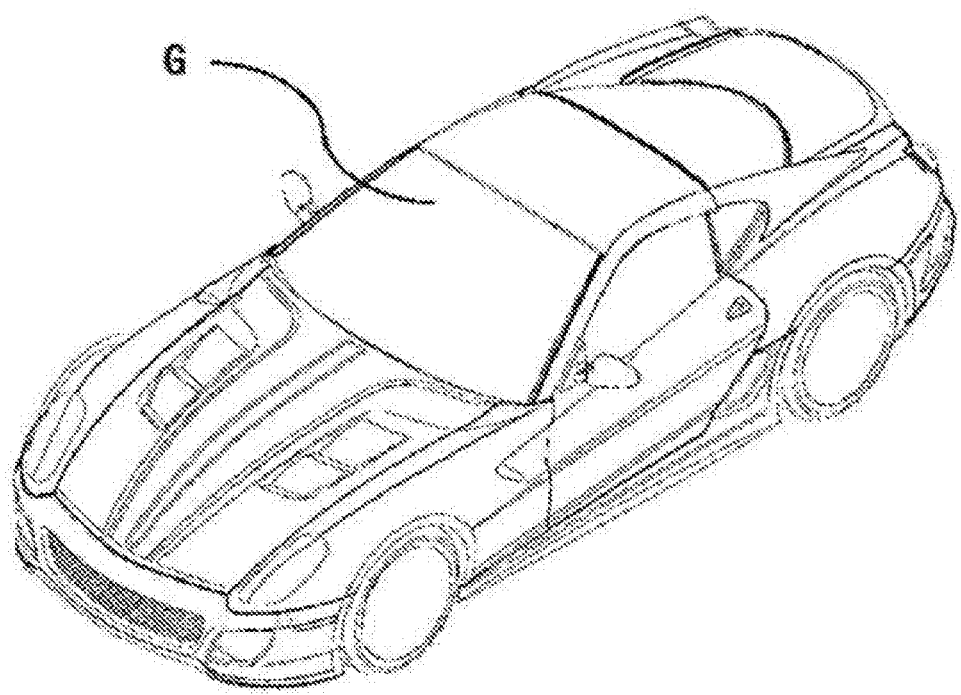

RESIN FILM FOR LAMINATED GLASS, AND LAMINATED GLASS AND PREPARATION THEREOF

TECHNICAL FIELD

Embodiments relate to a resin film for laminated glass, laminated glass comprising the resin film, and a process for manufacturing the laminated glass.

BACKGROUND ART

In general, laminated glass composed of a pair of glass panels and a resin film interposed between these panels is excellent in safety, since when it is broken, the shattered pieces thereof do not scatter. Thus, it is widely used as window glass of vehicles such as automobiles and as that of buildings.

It is required that such laminated glass should have not only the capability of preventing shattered glass pieces from being scattered but also the capability of sound insulation. The capability of sound insulation is represented as a transmission loss that depends on frequency. Specifically, JIS A 4708 specifies sound insulation ratings according to the transmission loss at an arbitrary frequency of 500 Hz or more.

Although conventional laminated glass has a good capability of preventing glass pieces from scattering, it has a problem that the sound insulation performance is deteriorated due to the coincident effect in the frequency region of around 2,000 Hz. Thus, an improvement is demanded. The coincidence effect refers to a phenomenon that, when a sound wave is incident on a glass plate, a transverse wave propagates along the surface of the glass plate due to the rigidity and inertia of the glass plate, and the resonance between the transverse wave and the incident sound wave causes transmission of sound.

In the meantime, according to the equivalent loudness curve, the human ears have a significantly higher sensitivity at a frequency in the range of 1,000 to 6,000 Hz as compared with other ranges of frequency. Therefore, it is important in the improvement of sound insulation to prevent the deterioration in the sound insulation performance caused by the coincidence effect.

In order to improve the sound insulation performance of laminated glass, it is necessary to prevent a deterioration of the sound insulation performance in the minimum region of the transmission loss caused by the coincidence effect. In order to prevent a deterioration of the sound insulation performance in the minimum region of the transmission loss, a variety of measures have been proposed such as an increase in the weight of laminated glass, a construction of laminated glass composed of multilayers, a division of the area of laminated glass, and an improvement in the support structure of laminated glass. However, these measures are not sufficiently effective, and their commercial values are low due to an increase in the manufacturing cost.

Meanwhile, the criteria for sound insulation performance have been increasingly strict in recent years. In particular, in the case of windowpanes for architectural use, a high performance of sound insulation near room temperature is required. Thus, it is required that laminated glass have a good capability of sound insulation even when the ambient temperature changes over a wide range from a low-temperature region to a high-temperature region.

However, the conventional laminated glass manufactured using a resin film made of a plasticized polyvinyl acetal resin has a problem that the temperature for maximum sound insulation performance is room temperature or higher, and the sound insulation performance around room temperature is poor. In addition, although attempts have been made to secure a good performance of sound insulation, the resin film is too soft so that such a problem as panel shearing, foaming, and the like tends to occur when the resin film is combined with glass panels in the manufacture of laminated glass.

Specifically, Japanese Laid-open Patent Publication No. Hei 02-229742 discloses a polymer film having a glass transition temperature of 15° C. or less, for example, a polymer film composed of a laminate of a vinyl chloride-ethylene-glycidyl methacrylate copolymer film and a plasticized polyvinyl acetal film. This polymer film, however, is incapable of exhibiting a sound insulation rating of Ts-35 or higher in the sound insulation ratings according to JIS A 4706. It also has a limited temperature range for sound insulation, failing to exhibit a satisfactory performance of sound insulation over a wide range of temperatures.

Further, Japanese Laid-open Patent Publication No. Sho 51-106190 discloses a construction produced by laminating two or more kinds of resins having different glass transition temperatures so that it has a vibration damping property over a wide range of temperatures. However, it is not apparent that the construction has such properties required for laminated glass as sound insulation, transparency, and the like. It also fails to satisfy the requirements for safety glass such as a high absorption of impact energy, scattering prevention upon glass breakage, and the like.

DISCLOSURE OF THE INVENTION

Technical Problem

Embodiments aim to provide a resin film with improved workability, so that a pair of glass panels can be effectively aligned in the process of manufacturing laminated glass, laminated glass comprising the resin film, and a process for manufacturing the laminated glass.

Solution to the Problem

According to an embodiment, there is provided a resin film for laminated glass, which comprises a resin layer comprising a polyvinyl acetal resin and a contact surface in direct contact with glass, wherein the contact surface has an Rz roughness of 25 to 90 µm and a maximum static friction coefficient at 20° C. of 0.85 to 1.60, and the compressive elastic deformation index defined by the following Equation 1 and measured in the perpendicular direction from the contact surface at 35° C. is 40 to 310 µm/N:

$$\text{Compressive elastic deformation index} = d/F \qquad [\text{Equation 1}]$$

wherein F is a force of 0.05 to 0.6 N applied in the direction perpendicular to the contact surface by a tip having a flat end and a diameter of 4 mm, and d is a depth that is compressively deformed in the perpendicular direction by the tip.

According to another embodiment, there is provided a resin film for laminated glass, which comprises a structure in which a first skin layer, an intermediate resin layer, and a second skin layer are sequentially laminated, wherein the first skin layer and the second skin layer each comprise a first contact surface or a second contact surface in direct contact with glass, the first skin layer and the second skin layer each comprise a first polyvinyl acetal resin, the first contact surface and the second contact surface each have an Rz roughness of 25 to 90 μm and a maximum static friction coefficient at 20° C. of 0.85 to 1.60, and the compressive elastic deformation index defined by the following Equation 1 and measured in the perpendicular direction from each of the first contact surface and the second contact surface at 35° C. is 40 to 310 μm/N:

Compressive elastic deformation index=$d/F$     [Equation 1]

wherein F is a force of 0.05 to 0.6 N applied in the direction perpendicular to the contact surface by a tip having a flat end and a diameter of 4 mm, and d is a depth that is compressively deformed in the perpendicular direction by the tip.

According to still another embodiment, there is provided laminated glass, which comprises a first glass panel; the resin film for laminated glass; and a second glass panel sequentially laminated.

According to still another embodiment, there is provided a process for manufacturing laminated glass, which comprises (1) disposing the resin film for laminated glass on a first glass panel; (2) disposing a second glass panel on the resin film for laminated glass; and (3) aligning the second glass panel with respect to the first glass panel.

Advantageous Effects of the Invention

The resin film according to the embodiments has a predetermined roughness of the contact surface in contact with glass and has a proper compressive elastic deformation index at 35° C. Further, the contact surface of the resin film according to the embodiments has a predetermined maximum static friction coefficient.

When a glass panel is disposed on the contact surface of the resin film, the glass panel can be properly slipped due to the proper roughness and the proper maximum static friction coefficient of the resin film. This makes it possible to easily align the first glass panel and the second glass panel in the preliminary joining step in the manufacturing process of the laminated glass according to the embodiments. In addition, since the resin film has a proper maximum static friction coefficient, the first glass panel and the second glass panel would not be misaligned in the course of transfer thereof once they have been aligned. Accordingly, the resin film and the process of manufacturing laminated glass according to the embodiments have improved workability.

BRIEF DESCRIPTION OF THE DRAWINGS

FIG. 1 is a cross-sectional view of a resin film for laminated glass according to an embodiment.

FIG. 2 is a cross-sectional view of a resin film for laminated glass according to another embodiment.

FIG. 3 is a schematic diagram showing a process of measuring a compressive elastic deformation index.

FIGS. 4 to 7 are cross-sectional views illustrating a process for manufacturing laminated glass according to an embodiment.

FIG. 8 is a perspective view of an automobile equipped with a windshield made of laminated glass according to an embodiment of the present invention.

| Description of the Numerals | |
|---|---|
| 10: resin film for laminated glass | 100: resin layer |
| 101: first contact surface | 102: second contact surface |
| 103: protrusion pattern | |
| 110: first skin layer | 120: second skin layer |
| 200: intermediate resin layer | G: laminated glass |
| 20: first glass panel | 30: second glass panel |

BEST MODE FOR CARRYING OUT THE INVENTION

Throughout the description of the embodiments, in the case where each panel, film, layer, window, or the like is mentioned to be formed "on" or "under" another panel, film, layer, window, or the like, it means not only that one element is directly formed on or under another element, but also that one element is indirectly formed on or under another element with other element(s) interposed between them. Also, the term "on" or "under" with respect to each element may be referenced to the drawings. For the sake of description, the sizes of individual elements in the appended drawings may be exaggeratingly depicted and do not indicate the actual sizes.

Resin Film for Laminated Glass

Referring to FIG. 1, a resin film (10) for laminated glass according to an embodiment comprises a resin layer (100). More specifically, the resin film may be composed of a single layer of the resin layer.

The resin layer is in direct contact, and laminated, with glass. More specifically, the glass may be laminated to the upper and lower sides of the resin layer, respectively.

The resin layer may comprise a first resin composition comprising a first polyvinyl acetal resin and a plasticizer.

First Polyvinyl Acetal Resin

The first polyvinyl acetal resin is obtained by acetalizing a polyvinyl alcohol with an aldehyde and may have a specific amount of acetyl groups. Specifically, the first polyvinyl acetal resin may have acetal groups with 3 to 4 carbon atoms, an amount of acetyl groups of 4% by mole or less, and an acetalization degree of 40% by mole or more. More specifically, the first polyvinyl acetal resin may have an amount of acetyl groups of 0.1 to 3% by mole or 0.1 to 2% by mole and an acetalization degree of 40 to 85% by mole or 46 to 64% by mole.

The amount of acetyl groups in a polyvinyl acetal is determined as a molar fraction in percent obtained by subtracting the amount of ethylene groups bonded to acetal groups and the amount of ethylene groups bonded to hydroxyl groups from the total amount of ethylene groups in the main chain, which value is then divided by the total amount of ethylene groups in the main chain. The amount of ethylene groups bonded to acetal groups can be measured, for example, in accordance with JIS K6728 on the "Test Method of Polyvinyl Butyral."

If the amount of acetyl groups in the first polyvinyl acetal resin exceeds 4% by mole, the sound insulation performance of the resin film thus prepared may be deteriorated.

In addition, the first polyvinyl acetal resin may have at least one substituent group selected from the group consisting of an acetal group, an acetyl group, and a hydroxyl group in the ethylene groups of the main chain.

Specifically, the first polyvinyl acetal resin may be prepared by obtaining an aqueous polyvinyl alcohol solution by dissolving a polyvinyl alcohol in water, maintaining the aqueous polyvinyl alcohol solution at 10 to 20° C., adding an aldehyde and a catalyst thereto, followed by the acetalization reaction to obtain a reaction solution, and maintaining the reaction solution at 40 to 60° C., followed by neutralization, washing with water, drying, and the like to produce the first polyvinyl acetal resin in the form of a powder.

The average degree of polymerization of the polyvinyl alcohol as a raw material for the first polyvinyl acetal resin is not particularly limited, but it may be 500 to 5,000 or 1,000 to 2,500. If the average degree of polymerization of the polyvinyl alcohol is less than 500, the resistance to penetration of laminated glass thus manufactured may be deteriorated. If the average degree of polymerization exceeds 5,000, the strength of laminated glass thus manufactured may be excessively high, thereby restricting the application field thereof.

Specifically, the first polyvinyl acetal resin may be prepared by a mixture of polyvinyl alcohols that comprise 5 to 15% by weight of a polyvinyl alcohol having a degree of polymerization of 1,000 to 1,300, 70 to 85% by weight of a polyvinyl alcohol having a degree of polymerization of 1,500 to 1,900, and 8 to 25% by weight of a polyvinyl alcohol having a degree of polymerization of 2,000 to 2,500.

In addition, the aldehyde to be used for obtaining the first polyvinyl acetal resin having acetal groups with 3 to 4 carbon atoms is not particularly limited, but it may be at least one selected from the group consisting of propionaldehyde, n-butyraldehyde, and isobutyraldehyde, which have 3 to 4 carbon atoms. It is preferable to use n-butyraldehyde among them that can increase the adhesive strength between the layers.

The first polyvinyl acetal resin may have a weight average molecular weight (Mw) of 27,000 to 350,000, 200,000 to 330,000, or 250,000 to 330,000. If the weight average molecular weight of the resin is less than 27,000, the resistance to penetration of laminated glass thus manufactured may be deteriorated. If the weight average molecular weight of the resin exceeds 350,000, the strength of laminated glass thus manufactured may be excessively high, thereby restricting the application field thereof.

In addition, the first polyvinyl acetal resin may have a degree of blocking of ethylene groups bonded to acetyl groups of 0.15 to 0.40 or 0.20 to 0.35. If the degree of blocking of ethylene groups is less than 0.15, the sound insulation performance of laminated glass thus manufactured may be deteriorated. If it exceeds 0.40, the degree of acetalization of the resin may be decreased, thereby deteriorating the impact resistance of laminated glass thus manufactured. Such first polyvinyl acetal resin may be prepared by acetalizing a polyvinyl alcohol having a degree of blocking of ethylene groups bonded to acetyl groups of 0.15 to 0.40. If a polyvinyl alcohol having such a high degree of randomness is used, a first polyvinyl acetal resin having a low glass transition temperature can be obtained. A resin film prepared therefrom may have a good flowability and can convert sound energy into heat energy more efficiently.

The content of OH in the first polyvinyl acetal resin may be 5 to 60% by mole. Specifically, the content of OH in the first polyvinyl acetal resin may be 15 to 60% by mole, 5 to 50% by mole, or 36 to 54% by mole.

In addition to the above, the first polyvinyl acetal resin may be a mixture of two or more types of polyvinyl acetal resins each obtained by acetalizing a polyvinyl alcohol with an aldehyde, or a polyvinyl acetal resin obtained by acetalizing a polyvinyl alcohol with other aldehydes, along with the above-mentioned aldehyde, in an amount not exceeding 30% by weight based on the total amount of the acetal groups.

Plasticizer

The kind of the plasticizer is not particularly limited. For examples, the plasticizer may be at least one selected from the group consisting of an ester-based plasticizer such as monobasic acid esters, polybasic acid esters, and the like; and a phosphoric acid-based plasticizer such as organic phosphoric acid-based compounds, organic phosphorous acid-based compounds, and the like.

The monobasic acid ester may be a glycol-based ester prepared by reacting a glycol compound such as triethylene glycol, tetraethylene glycol, tripropylene glycol, or the like with an organic acid such as butyric acid, isobutyric acid, caproic acid, 2-ethylbutyric acid, heptanoic acid, n-octylic acid, 2-ethylhexyl acid, pelargonic acid (or n-nonylic acid), decylic acid, or the like. Specifically, the monobasic acid ester may be at least one selected from the group consisting of triethylene glycol di-2-ethylbutyrate, triethylene glycol di-2-ethylhexanoate, triethylene glycol-dicapronate, and triethylene glycol di-n-octoate.

The polybasic acid ester may be an ester prepared by reacting a linear or branched alcohol having 4 to 8 carbon atoms with an organic acid such as adipic acid, sebacic acid, azelaic acid, or the like. Specifically, the polybasic acid ester may be at least one selected from the group consisting of dibutyl sebacate, dioctyl azelate, and dibutyl carbitol adipate.

Examples of the phosphoric acid-based plasticizer include tributoxyethyl phosphate, isodecyl phenyl phosphate, and triisopropyl phosphite.

The content of the plasticizer is not particularly limited, but it may be 20 to 50 parts by weight, 20 to 40 parts by weight, or 25 to 40 parts by weight, based on 100 parts by weight of the first polyvinyl acetal resin.

Additive

The first resin composition may comprise an additive. The additive may include at least one selected from the group consisting of an ultraviolet absorber, an ultraviolet stabilizer, an antioxidant, and a heat stabilizer.

Examples of the ultraviolet absorber include benzotriazole-based, benzophenone-based, and cyanoacrylate-based ultraviolet absorbers. The benzotriazole-based ultraviolet absorber may be, for example, 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3 '-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-amylphenyl)benzotriazole, 2-[2'-hydroxy-3'-(3",4",5",6"-tetrahydrophthalamidemethyl)-5'-methylphenyl]benzotriazole, or the like. In addition, the benzophenone-based ultraviolet absorber may be, for example, 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, or the like. Further, the cyanoacrylate-based ultraviolet absorber may be, for example, 2-ethylhexyl-2-cyano-3,3'-diphenylacrylate, ethyl-2-cyano-3,3'-diphenylacrylate, or the like.

The heat stabilizer may be, for example, surfactants such as sodium lauryl sulfate, alkylbenzenesulfonic acid, or the like.

Examples of the ultraviolet stabilizer include a hindered amine-based compound or a metal complex salt-based compound. The hindered amine-based compound may be, for example, bis(2,2,6,6-tetramethyl-4-piperidyl) sebacate, tetrakis(2,2,6,6-tetramethyl-4-piperidyl) 1,2,3,4-butanetetracarboxylate, or the like. Examples of commercially available products include Sanol LS-770, Sanol LS-765, Sanol LS-2626, Chimassob 944LD, Thinuvin-622 LD, Mark LA-57, Mark LA-77, Mark LA-62, Mark LA-67, Mark LA-63, Mark LA-68, Mark-82, Mark LA-87, and Goodrite UV-3404. In addition, the metal complex salt-based compound may be, for example, nickel [2,2]-thiobis(4-t-octyl) phenolate]-n-butylamine, nickel dibutyldithiocarbamate, nickel bis[0-ethyl-3,5-(di-t-butyl-4-hydroxybenzyl)]phosphate, cobalt dicyclohexyldithiophosphate, [1-phenyl-3-methyl-4-decanoyl-pyrazolate] nickel, or the like.

Examples of the antioxidant include phenol-based, sulfur-based, and phosphorus-based compounds. Specifically, the antioxidant may comprise at least one selected from the group consisting of 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylene-bis-(4-methyl-6-butylphenol), 2,2'-methylene-bis(4-ethyl-6-t-butylphenol), 4,4'-thiobis-(3-methyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4'-hydroxyphenyl)propionate]methane, 1,1,3-tris-(2-methyl-4-hydroxy-5-t-butylphenol)butane, 1,3,5-trimethyl-2,4,6-tris(3,5-di-t-butyl-4-hydroxybenzyl)benzene, and bis(3,3'-bis-(4'-hydroxy-3'-t-butylphenol)butyric acid)glycol ester.

The content of the additive is not particularly limited, but it may be 0.01 to 5 parts by weight based on 100 parts by weight of the first polyvinyl acetal resin.

Resin Layer

The resin layer comprises a contact surface that is in direct contact with glass. Specifically, the glass may be in direct contact with the upper and lower sides of the resin layer, respectively. That is, the upper and lower sides of the resin layer may be the first contact surface (101) and the second contact surface (102), respectively. In such event, one or both of the first contact surface and the second contact surface may have the characteristics as described below.

When the glass is disposed on the contact surface and the glass and the resin layer are preliminarily joined by the weight of the glass, the glass can properly slide on the contact surface. In addition, the contact surface may be formed with a protrusion pattern (103) such as irregularity, roughness, melt fracture, or the like.

In order for the glass to be properly slipped on the contact surface, the contact surface may have an Rz roughness of 25 to 90 μm and a maximum static friction coefficient at 20° C. of 0.85 to 1.60, and the compressive elastic deformation index defined by the following Equation 1 and measured in the perpendicular direction from the contact surface at 35° C. is 40 to 310 μm/N:

$$\text{Compressive elastic deformation index} = d/F \quad \text{[Equation 1]}$$

wherein F is a force of 0.05 to 0.6 N applied in the direction perpendicular to the contact surface by a tip having a flat end and a diameter of 4 mm, and d is a depth that is compressively deformed in the perpendicular direction by the tip.

Specifically, the resin film may have a compressive elastic deformation index of 40 to 300 μm/N or 40 to 290 μm/N when F is 0.05 to 0.6 N. More specifically, the resin film may have a compressive elastic deformation index of 80 to 310 μm/N when F is 0.05 to 0.2 N, and the resin film may have a compressive elastic deformation index of 60 to 140 μm/N when F is 0.2 to 0.4 N.

The compressive elastic deformation index stands for the extent of deformation of the resin layer when a certain pressure is applied in the perpendicular direction in a state where specific roughness, irregularities, melt fractures, or the like are formed on the contact surface.

The compressive elastic deformation index may hinge on the roughness, the shape of irregularities, the shape of patterns, the shape of melt fractures, or the like of the contact surface. In addition, the compression elastic deformation index may hinge on the composition and the thickness of the resin layer. That is, the compressive elastic deformation index may hinge on the shape of the contact surface and on the composition and thickness of the resin layer.

For example, the compressive elastic deformation index may be within the above range when the contact surface has an Rz roughness of 25 to 90 μm or 50 to 70 μm and a wavy shape of irregularities, and the resin layer comprises 100 parts by weight of a polyvinyl acetal resin and 20 to 40 parts by weight of a plasticizer, wherein the content of acetyl groups in the polyvinyl acetal is 0.1 to 3% by mole, the content of hydroxyl groups in the polyvinyl acetal is 36 to 54% by mole, the weight average molecular weight of the polyvinyl acetal is 250,000 to 330,000, and the thickness of the resin layer is 580 to 940 μm. In more detail, the compressive elastic deformation index may be within the above range when the polyvinyl acetal has a polyvinyl acetal component having a molecular weight smaller than the weight average molecular weight of the polyvinyl acetal by −30% or more in a content of 3 to 10% by weight and a polyvinyl acetal component having a molecular weight greater than the weight average molecular weight of the polyvinyl acetal by 30% or more in a content of 7 to 20% by weight.

The contact surface may have a maximum static friction coefficient at 20° C. of 0.85 to 1.60 or 0.9 to 1.5. Further, the maximum static friction coefficient at 40° C. of the contact surface may be 1.05 to 1.80 or 1.20 to 1.70. In addition, the maximum static friction coefficient at 45° C. of the contact surface may be 1.20 to 2.10 or 1.30 to 2.10.

The maximum static friction coefficient may hinge on the composition of the resin layer, the roughness, the shape of irregularities, the shape of patterns, and the shape of melt fractures of the contact surface, the compressive elastic deformation index, and the like. That is, the maximum static friction coefficient may hinge on the friction characteristics of the substance itself according to the composition of the resin layer, the shape of the contact surface, and the compressive elastic deformation index in combination.

For example, the maximum static friction coefficient may be within the above range when the contact surface has an Rz roughness of 25 to 90 μm or 50 to 70 μm and a wavy shape of irregularities, and the resin layer comprises 100 parts by weight of a polyvinyl acetal resin and 20 to 40 parts by weight of a plasticizer, wherein the content of acetyl groups in the polyvinyl acetal is 0.1 to 3% by mole, the content of hydroxyl groups in the polyvinyl acetal is 36 to 54% by mole, the weight average molecular weight of the polyvinyl acetal is 250,000 to 330,000, the thickness of the resin layer is 580 to 940 μm, and the compressive elastic deformation index is 40 to 290 μm/N when F is 0.05 to 0.6 N. In more detail, the maximum static friction coefficient may be within the above range when the polyvinyl acetal has a polyvinyl acetal component having a molecular weight smaller than the weight average molecular weight of the polyvinyl acetal by −30% or more in a content of 3 to 10% by weight and a polyvinyl acetal component having a molecular weight greater than the weight average molecular weight of the polyvinyl acetal by 30% or more in a content of 7 to 20% by weight.

The resin film according to the embodiment may be used for a laminate of a pair of glass panels. In such event, the glass panels may be preliminarily joined with the resin film, then transferred to a heat treatment apparatus, and finally joined by heating. At this time, the glass panels should be properly slipped on the resin film in the preliminary joining step and should not be slipped during the transfer step. That is, the resin film must have a proper slip property.

In order for the resin film to have a proper slip property, the resin layer should have a proper compressive elastic deformation index as described above, and the contact surface should have a proper maximum static friction coefficient as described above. In particular, since the transfer and preliminary joining steps are carried out at a temperature of 20 to 45° C., it is necessary to have a proper maximum static friction coefficient at the above temperatures.

Further, when the surface roughness Rz of the contact surface is within the above range, air between the resin film and the glass panels can be effectively escaped in the preliminary and final joining steps.

As described above, when the resin film has a surface roughness, a maximum static friction coefficient, and a compressive elastic deformation index as described above, the resin film has a proper slip property and a de-airing effect, thereby materializing improved workability.

The resin film for laminated glass according to an embodiment comprises a structure in which a first skin layer, an intermediate resin layer, and a second skin layer are sequentially laminated, wherein the first skin layer and the second skin layer each comprise a first contact surface or a second contact surface in direct contact with glass, the first skin layer and the second skin layer each comprise a first polyvinyl acetal resin, the first contact surface and the second contact surface each have an Rz roughness of 25 to 90 μm and a maximum static friction coefficient at 20° C. of 0.85 to 1.60, and the compressive elastic deformation index defined by the following Equation 1 and measured in the perpendicular direction from each of the first contact surface and the second contact surface at 35° C. is 40 to 310 μm/N:

$$\text{Compressive elastic deformation index} = d/F \quad \text{[Equation 1]}$$

wherein F is a force of 0.05 to 0.6 N applied in the direction perpendicular to the contact surface by a tip having a flat end and a diameter of 4 mm, and d is a depth that is compressively deformed in the perpendicular direction by the tip.

Referring to FIG. 2, the resin film for laminated glass according to the embodiment may have a three-layer structure. Specifically, the resin film (10) may have a structure in which a first skin layer (110), an intermediate resin layer (200), and a second skin layer (120) are sequentially laminated.

The first skin layer and the second skin layer may be formed of a third resin composition and a fourth resin composition, respectively. The third resin composition and the fourth resin composition may be the same as the first resin composition. Specifically, the first skin layer and the second skin layer may each comprise the first resin composition, which comprises the first polyvinyl acetal resin and the plasticizer.

The intermediate resin layer serves as a sound insulation layer for damping noise to thereby block external noise. The resin composition used to form the intermediate resin layer is not particularly limited, but it may be a second resin composition comprising a second polyvinyl acetal resin and a plasticizer.

Second Polyvinyl Acetal Resin

The second polyvinyl acetal resin is obtained by acetalizing a polyvinyl alcohol with an aldehyde and may have a specific amount of acetyl groups. Specifically, the second polyvinyl acetal resin may have acetal groups with 4 to 6 carbon atoms, an amount of acetyl groups of 8 to 30% by mole, and an acetalization degree of 40% by mole or more. More specifically, the second polyvinyl acetal resin may have an amount of acetyl groups of 10 to 24% by mole and an acetalization degree of 40 to 80% by mole or 55 to 80% by mole.

If the amount of acetyl groups in the second polyvinyl acetal resin is less than 8% by mole, the sound insulation performance of a resin film thus prepared may be deteriorated. If the amount of acetyl groups in the second polyvinyl acetal resin exceeds 30% by mole, the reactivity thereof with an aldehyde may be impaired.

In addition, if the acetalization degree of the second polyvinyl acetal resin is less than 40% by mole, the compatibility thereof with a plasticizer is deteriorated. And there may arise a problem that it is difficult to add a plasticizer in an amount required to exhibit the sound insulation performance of a resin film thus prepared. In particular, it is preferable that the second polyvinyl acetal resin has a narrow distribution of acetalization degree. Specifically, it is preferable that 90% or more of the distribution of acetalization degree falls within a range of −2 to +2% by mole of the average acetalization degree. It is possible to obtain a resin film that exhibits an excellent performance of sound insulation over a wide range of temperatures by using the second polyvinyl acetal resin having a narrow distribution of acetalization degree as described above. Specifically, such a resin film may satisfy a JIS sound insulation rating of Ts-40.

The second polyvinyl acetal resin having a narrow distribution of acetalization degree as described above may be prepared by maintaining an aqueous polyvinyl alcohol solution at a low temperature, preferably 15° C. or lower, when an aldehyde and a catalyst are added thereto. In addition, the second polyvinyl acetal resin may be prepared by reducing the amount of a catalyst to 60% by weight of the amount thereof conventionally used in the preparation of the resin. Further, in the preparation of the second polyvinyl acetal resin, the catalyst may be added gradually in small amounts over a period of, for example, 30 minutes to 3 hours, or a polyvinyl acetal resin having a narrow distribution of acetalization degree may be separated and extracted in each specific range of acetalization degree using several solvents having different polarities. The distribution of acetalization degree of the second polyvinyl acetal resin may be measured by a method such as liquid chromatography or thin layer chromatography.

In addition, the second polyvinyl acetal resin may have at least one substituent selected from the group consisting of an acetal group, an acetyl group, and a hydroxyl group in the ethylene groups of the main chain. Specifically, the second polyvinyl acetal resin may be prepared by obtaining an aqueous polyvinyl alcohol solution by dissolving a polyvinyl alcohol in water, maintaining the aqueous polyvinyl alcohol solution at 10 to 20° C., adding an aldehyde and a catalyst thereto, followed by the acetalization reaction to obtain a reaction solution, and maintaining the reaction solution at 40 to 60° C., followed by neutralization, washing with water, drying, and the like to produce the second polyvinyl acetal resin in the form of a powder.

When the acetalization reaction of a polyvinyl alcohol is carried out as described above, an aldehyde may be used in an excessive amount of 10 to 200% by mole based on the acetalization degree of a second polyvinyl acetal resin to be prepared, or a catalyst may be used in an amount of greater than the amount thereof conventionally used, so that a second polyvinyl acetal resin having intermolecular crosslinking can be easily obtained. Specifically, an aldehyde may be used in an excessive amount of 15 to 50% by mole based on the acetalization degree of the second polyvinyl acetal resin (A).

If the excessive amount of the aldehyde is less than 10% by mole, the intermolecular crosslinking does not well take place, so that the resin film thus prepared hardly exhibits an excellent performance of sound insulation over a wide range of temperatures. If the excessive amount of the aldehyde exceeds 200% by mole, gelation may take place in the process of producing the second polyvinyl acetal resin, thereby impairing the reaction between the polyvinyl alcohol and the aldehyde.

In addition to the above, the second polyvinyl acetal resin may be obtained by carrying out an intermolecular crosslinking reaction by adding a small amount of a polyfunctional aldehyde. The polyfunctional aldehyde is not particularly limited, and examples thereof include glutaraldehyde, 4,4'-(ethylenedioxy)dibenzaldehyde, 2-hydroxyhexanedial, and the like. Further, the amount of the polyfunctional aldehyde to be added is not particularly limited and may be, for example, 0.001 to 1.0% by mole or 0.01 to 0.5% by mole, based on 1% by mole of the hydroxyl groups in the polyvinyl alcohol.

The average degree of polymerization of the polyvinyl alcohol as a raw material for the second polyvinyl acetal resin is not particularly limited, but it may be 500 to 5,000 or 1,000 to 2,500. If the average degree of polymerization of the polyvinyl alcohol is less than 500, the resistance to penetration of laminated glass thus manufactured may be deteriorated. If the average degree of polymerization exceeds 5,000, the strength of laminated glass thus manufactured may be excessively high, thereby restricting the application field thereof.

In addition, the aldehyde to be used for obtaining the second polyvinyl acetal resin having acetal groups with 4 to 6 carbon atoms is not particularly limited, but it may be at least one selected from the group consisting of n-butyraldehyde, isobutyraldehyde, valeraldehyde, n-hexyraldehyde, and 2-ethylbutyraldehyde, which have 4 to 6 carbon atoms. It is preferable to use n-butyraldehyde, isobutyraldehyde, or n-hexyraldehyde among them alone or in combination of two or more thereof. It is more preferable to use n-hexyraldehyde that can increase the adhesive strength between the layers. If the number of carbon atoms in the aldehyde is less than 4, the sound insulation performance of a resin film thus produced may be deteriorated. If the number of carbon atoms exceeds 6, the reactivity of the resin for the acetalization and the sound insulation performance of the resin film thus produced near room temperature may be impaired.

The standard deviation of the amount of ethylene groups bonded to an acetyl group in the second polyvinyl acetal resin may be 2.5 to 8 or 3 to 6. If the standard deviation is less than 2.5, the resin film thus prepared has a limitation in exhibiting a good performance of sound insulation over a wide range of temperatures. If the standard deviation exceeds 8, the maximum performance of sound insulation of the resin film thus prepared may be impaired. The standard deviation is a value that stands for how many ethylene groups are bonded to one acetyl group and can be measured by the $^{13}C$-NMR analysis.

The process for preparing the second polyvinyl acetal resin having a standard deviation of the amount of ethylene groups bonded to acetyl groups of 2.5 to 8 is not particularly limited. Examples of the process may include a process of acetalizing a polyvinyl alcohol obtained by carrying out the saponification of a polyvinyl acetate in several steps; a process of acetalizing a mixture of a plurality of polyvinyl alcohols having different degrees of saponification; and a process of mixing a plurality of polyvinyl acetal resins having different amounts of acetyl groups.

The second polyvinyl acetal resin preferably has a molecular weight distribution ratio (Mw/Mn) of 1.01 to 1.50. If the second polyvinyl acetal resin having a molecular weight distribution ratio (Mw/Mn) in the range of 1.01 to 1.50 is used, the coincidence effect around room temperature is remarkably alleviated, so that an excellent sound insulation rating according to JIS A 4706 over Ts-35 can be obtained. On the other hand, if the molecular weight distribution ratio (Mw/Mn) is less than 1.01, the synthesis of the second polyvinyl acetal resin may be difficult. If it exceeds 1.50, the sound insulation performance in the minimum region of the transmission loss may be deteriorated. The second polyvinyl acetal resin having such a narrow molecular weight distribution ratio (Mw/Mn) can be obtained by a method of fractionating a known polyvinyl acetal using fractional chromatography.

In addition, the second polyvinyl acetal resin may have a weight average molecular weight (Mw) of 100,000 to 600,000 or 300,000 to 500,000. If the weight average molecular weight of the resin is less than 100,000, the resistance to penetration of laminated glass thus manufactured may be deteriorated. If the weight average molecular weight of the resin exceeds 600,000, the strength of laminated glass thus manufactured may be excessively high, thereby restricting the application field thereof.

The second polyvinyl acetal resin may have a degree of blocking of ethylene groups bonded to acetyl groups of 0.55 to 0.90 or 0.65 to 0.80. If the degree of blocking of ethylene groups is less than 0.55, the sound insulation performance of laminated glass thus manufactured may be deteriorated. If it exceeds 0.90, the acetalization degree of the resin may be decreased, thereby impairing the impact resistance of laminated glass thus manufactured. Such a second polyvinyl acetal resin may be obtained by acetalizing a polyvinyl alcohol having a degree of blocking of ethylene groups bonded to acetyl groups of 0.55 to 0.90. If a polyvinyl alcohol having such a high degree of randomness is used, a second polyvinyl acetal resin having a low glass transition temperature can be obtained. A resin film prepared therefrom may have a good flowability and can convert sound energy to heat energy more efficiently.

It is preferable that the second polyvinyl acetal resin is a crosslinked polyvinyl acetal resin having a viscosity of 200 to 1000 cP (as measured by a BM-type viscometer) when the second polyvinyl acetal resin is dissolved in a mixed solvent of ethanol and toluene (at a weight ratio of 1:1) at a concentration of 10% by weight. More preferably, it is a crosslinked polyvinyl acetal resin having a viscosity of 300 to 800 cP. If a crosslinked polyvinyl acetal resin is used, the effective temperature range for converting sound energy to heat energy is broadened, so that a resin film that is excellent in the sound insulation performance even near room temperature can be obtained.

The content of OH in the second polyvinyl acetal resin may be 5 to 30% by mole. Specifically, the content of OH in the second polyvinyl acetal resin may be 6 to 20% by mole.

In addition to the above, the second polyvinyl acetal resin may be a mixture of two or more polyvinyl acetal resins each obtained by acetalizing a polyvinyl alcohol with an aldehyde, or a polyvinyl acetal resin obtained by acetalizing a polyvinyl alcohol with other aldehydes, along with the above-mentioned aldehyde, in an amount not exceeding 30% by weight based on the total amount of the acetal groups.

Plasticizer

The plasticizer may have substantially the same characteristics as those of the plasticizer described with regard to the first resin composition. In such event, the plasticizer of the first resin composition and the plasticizer of the second resin composition may be the same as, or different from, each other.

The content of the plasticizer is not particularly limited, but it may be 30 to 40 parts by weight based on 100 parts by weight of the second polyvinyl acetal resin.

Additive

The second resin composition may further comprise an additive for improving the physical properties thereof.

Examples of the additive are not particularly limited and may include at least one selected from the group consisting of an ultraviolet absorber, an ultraviolet stabilizer, an antioxidant, and a heat stabilizer. The ultraviolet absorber, the ultraviolet stabilizer, the antioxidant, and the heat stabilizer may be substantially the same as the ultraviolet absorber, ultraviolet stabilizer, antioxidant, and heat stabilizer described with regard to the first resin composition.

The content of the additive in the second resin composition is not particularly limited, but it may be 0.01 to 5 parts by weight based on 100 parts by weight of the second polyvinyl acetal resin.

The resin film (10) for laminated glass of the embodiment may comprise a first skin layer (110) laminated on the intermediate resin layer (200) and a second skin layer (120) laminated under the intermediate resin layer.

The upper side of the first skin layer is a first contact surface (101) in direct contact with glass. The lower side of the second skin layer is a second contact surface (102) in direct contact with another glass.

The first contact surface and the second contact surface may have substantially the same characteristics as those of the contact surface of FIG. 1 as described above. That is, the first contact surface and/or the second contact surface may have a surface roughness Rz and a maximum static friction coefficient as described with reference to FIG. 1. In addition, the first skin layer and/or the second skin layer may have a compressive elastic deformation index as described with reference to FIG. 1.

The total thickness of the resin film according to the embodiment may be 580 to 940 μm or 700 to 800 μm. In addition, the thickness of the intermediate resin layer may be 80 to 140 μm. The thicknesses of the first skin layer and the thicknesses of the second skin layer may be 250 to 400 μm, respectively.

The resin film according to the embodiment may have improved workability as well as an improved performance of sound insulation.

Process for Manufacturing Laminated Glass

The process for manufacturing laminated glass according to an embodiment comprises (1) disposing the resin film for laminated glass on a first glass panel; (2) disposing a second glass panel on the resin film for laminated glass; and (3) aligning the second glass panel with respect to the first glass panel.

As illustrated in FIGS. 4 to 7, the resin film according to the embodiment can be laminated with a pair of glass panels by the following process.

Step (1)

In this step, the resin film for laminated glass is disposed on a first glass panel.

Referring to FIG. 4, the resin film (10) for laminated glass is disposed on a first glass panel (20). The lower side of the resin film may be in direct contact with the upper side of the first glass panel.

Step (2)

In this step, a second glass panel is disposed on the resin film for laminated glass.

Referring to FIG. 5, a second glass panel (30) is disposed on the resin film (10) for laminated glass. At this time, the first glass panel and the second glass panel may be misaligned. The upper side of the resin film may be in direct contact with the lower side of the second glass panel.

Step (3)

In this step, the second glass panel is aligned with respect to the first glass panel.

Referring to FIG. 6, the second glass panel is moved relative to the resin film to align with the first glass panel. In such event, the second glass panel can move while it is in contact with the resin film.

The contact surface, that is, the upper side of the resin film has a proper slip property as in the embodiments described above. In particular, the contact surface of the resin film can be readily moved by a suitable external force despite the friction exerted by the weight of the second glass panel.

Thus, the operator or the alignment apparatus can easily align the first glass panel with the second glass panel while the second glass panel is in contact with the resin film.

Thereafter, the first glass panel, the resin film, and the second glass panel are preliminarily joined at a predetermined temperature. The temperature of the preliminary joining may be 30 to 90° C.

Then, the preliminarily joined laminated glass is transferred to an oven for heat treatment. In such event, since the resin film according to the embodiment has a proper maximum static friction coefficient and a proper compressive elastic deformation index as described above, the first glass panel and the second glass panel would not be misaligned in the course of the transfer of the preliminarily joined laminated glass. That is, since the resin film has a proper maximum static friction coefficient and a proper compressive elastic deformation index, the second glass panel would not slip during the transfer.

In addition, the preliminarily joined laminated glass may be transferred before the heat applied in the preliminary joining step dissipates. Since the contact surface of the resin layer has a high static friction coefficient at temperatures of 40° C. and 45° C., it is possible to more effectively prevent the second glass panel from slipping during the transfer.

Referring to FIG. 7, the preliminarily joined laminated glass in the oven is subjected to the final joining step. Then, the outer portion of the resin film may be cut so that the resin film conforms to the first glass panel and the second glass panel.

As described above, since the resin layer, the first skin layer, and the second skin layer have a maximum static friction coefficient within the above range, laminated glass manufactured using the resin film (10) for laminated glass of the embodiment can have advantageous effects.

Specifically, the laminated glass may be manufactured through such steps as cutting, polishing, molding, washing, lamination, and the like. Here, the lamination refers to a step of inserting a resin film (e.g., a PVB film) between two glass panels and removing air present inside to increase the adhesive strength between the glass panels and the resin film, thereby securing the visibility of the laminated glass. The temperature (15 to 45° C.) and the humidity (relative humidity of 15 to 40%) in the lamination step may be controlled to adjust the physical properties of the laminated glass.

In the case where a slip occurs at the interface between the glass panels and the resin film of a laminate that has a structure in which the resin film is inserted between two glass panels while it is transferred for the lamination step, the two glass panels and the resin film may be laminated while they are misaligned, thereby producing laminated glass with defective pairing.

However, since the resin film (10) for laminated glass of the embodiment comprises a contact surface having a maximum static friction coefficient within the above specific range, it is possible to prevent defective pairing in the process of manufacturing laminated glass.

Further, since the contact surface has a surface roughness within the predetermined range as described with regard to the foregoing embodiment, bubbles present between the resin film and the glass panels can be effectively removed in the preliminary joining and the final joining steps.

Laminated Glass

An embodiment provides laminated glass, which comprises a resin film, a first glass panel, and a second glass panel. Specifically, the laminated glass may have a structure in which a first glass panel, the resin film for laminated glass, and a second glass panel are sequentially laminated.

Referring to FIG. 7, the resin film (10) comprised in the laminated glass (G) of the embodiment is located in the middle of the laminated glass (G). A detailed description thereon is the same as that described above with regard to the resin film for laminated glass.

The first glass panel (20) and the second glass panel (30) comprised in the laminated glass (G) of the embodiment are disposed on and under the resin film (10), respectively. The first glass panel (20) and the second glass panel (30) are not particularly limited as long as they are glass panels known in the art. They may be made of the same, or different, components. Specifically, the first glass panel (20) and the second glass panel (30) may each be a glass plate such as float plate glass, polished plate glass, patterned plate glass, meshed glass, wired glass, colored glass, heat absorbing glass, and the like. Further, the first glass panel (20) and the second glass panel (30) may be made of polycarbonate, polymethyl methacrylate, or the like that has excellent transparency in addition to inorganic glass.

The laminated glass (G) may be manufactured by a process known in the art. For example, it may be manufactured by a process in which the resin film (10) is inserted between the first glass panel (20) and the second glass panel (30), followed by heating or melting and then cooling or solidification thereof.

Since the laminated glass (G) comprises the resin film (10) for laminated glass as described above, it is excellent in the sound insulation performance and optical performance.

Automobile

An embodiment provides an automobile that comprises a windshield made of the laminated glass.

Referring to FIG. 8, the automobile of the embodiment has a windshield made of the laminated glass (G) and installed as a front glass window. The windshield serves to allow the driver to observe the outside with the naked eye and block the wind from the outside. Since the windshield is made of the laminated glass (G), it is excellent in the sound insulation performance, optical performance, ultraviolet shielding performance, and the like.

Detailed Embodiments for Carrying Out the Invention

Hereinafter, the present invention is explained in detail by the following Examples. However, the following Examples are intended to further illustrate the present invention. The scope of the present invention is not limited thereto only.

EXAMPLE

Measurement of the acetalization degree of first and second polyvinyl acetal resins: A polyvinyl acetal resin was dissolved in a solution of heavy water-benzene at a concentration of 2% by weight, tetramethylsilane [$(CH_3)_4Si$] was added thereto as a reference material, and the degree of acetalization was measured at 23° C. by H-NMR spectrum.

Measurement of the amount of acetal groups in first and second polyvinyl acetal resins: It was measured according to the test method of "vinyl acetal" in the section of composition analysis of the polyvinyl acetal test method (JIS K-6728-1977).

Fractionation of first and second polyvinyl acetal resins: the polyvinyl acetal resins were each fractionated with fractionation GPC (LS-8000 system) in which an HFIP fractionation column from Showa Denko K.K. and hexafluoroisopropanol as a solvent were used.

Preparation Example 1

Preparation of a First Polyvinyl Acetal Resin 15 g of a polyvinyl alcohol having a polymerization degree of 1,100, 150 g of a polyvinyl alcohol having a polymerization degree of 1,700 and 25 g of a polyvinyl alcohol having a polymerization degree of 2,300 were added to 2,910 g of water and dissolved by heating at 90° C.

The reaction system was adjusted to 12° C., and 201 g of 35% by weight hydrochloric acid and 104 g of n-butyraldehyde were added thereto to precipitate a polyvinyl acetal. Thereafter, the reaction solution was maintained at 50° C. for 4 hours to complete the reaction, and the unreacted aldehyde was removed by washing with an excess of water. Thereafter, the reaction mixture was neutralized with a hydrochloric acid catalyst to remove salts and then dried to obtain a first polyvinyl acetal resin in a white powder form. The first polyvinyl acetal resin thus prepared had an acetalization degree of 56.9% by mole and an amount of acetyl groups of 1.6% by mole.

Preparation Example 2

Preparation of a Second Polyvinyl Acetal Resin 191 g of a polyvinyl alcohol having a polymerization degree of 1,700 was added to 2,890 g of water and dissolved by heating at 90° C. The reaction system was adjusted to 12° C., and 201 g of 35% by weight hydrochloric acid and 130 g of n-butyraldehyde were added thereto to precipitate a polyvinyl acetal. Thereafter, the reaction solution was maintained at 50° C. for 5 hours to complete the reaction, and the unreacted aldehyde was removed by washing with an excess of water. Thereafter, the reaction mixture was neutralized with a hydrochloric acid catalyst to remove salts and then dried to obtain a second polyvinyl acetal resin in a white powder form. The second polyvinyl acetal resin thus prepared had an acetalization degree of 60.2% by mole and an amount of acetyl groups of 11.9% by mole.

Preparation Example 3

Preparation of a First Resin Composition 70.9 g of the first polyvinyl acetal resin of Preparation Example 1, 26 g of triethylene glycol-di-2-ethylbutyrate as a plasticizer, and 0.6 g of 2-(2'-hydroxy-5'-methylphenyl)benzotriazole as an ultraviolet absorber were mixed and sufficiently kneaded with a mixing roller to prepare a first resin composition.

Preparation Example 4

Preparation of a Second Resin Composition 63.85 g of the second polyvinyl acetal resin of Preparation Example 2, 36 g of triethylene glycol-di-2-ethylbutyrate as a plasticizer, and 0.15 g of tetrakis[methylene-3-(3',5'-butyl-4'-hydroxyphenyl)propionate]methane were mixed and sufficiently kneaded with a mixing roller to prepare a second resin composition.

TABLE 1

| Resin | Acetalization degree (% by mole) | Amount of acetyl groups (% by mole) | Amount of OH (% by mole) | Weight avg. molecular weight |
|---|---|---|---|---|
| First polyvinyl acetal resin | 56.9 | 1.6 | 41.5 | 280,000 |
| Second polyvinyl acetal resin | 60.2 | 11.9 | 7.5 | 400,000 |

Example 1

Preparation of a Resin Film

The first resin composition was extruded at 200° C. and cast to obtain a resin film for laminated glass having an average thickness of 760 μm. Thereafter, the surface thereof was treated by the melt fracture method such that the surface roughness at 150° C. was 67 μm.

The equipment used for extrusion was a TEX, 70 Φ extruder from Brabender, and the screw speed was 300 rpm.

Examples 2 and 3

A resin film for laminated glass was prepared in the same manner as in Example 1, except that the average thickness and the average roughness of the resin film and the configuration and composition of the resin film were changed as shown in Table 2.

Preparation Example 5

Preparation of a Third Resin Composition

A third polyvinyl acetal resin was prepared in the same manner as in Preparation Example 1, except that 190 g of a polyvinyl alcohol having a polymerization degree of 1,700 was used alone. The third polyvinyl acetal resin thus prepared had an acetalization degree of 79.2% by mole, an amount of acetyl groups of 1.3% by mole, a content of hydroxyl groups of 19.4% by mole, and a weight average molecular weight of 310,000.

Comparative Example 1

73.4 g of the third polyvinyl acetal resin of Preparation Example 5, 26 g of triethylene glycol-di-2-ethylbutyrate as a plasticizer, and 0.6 g of 2-(2'-hydroxy-5'-methylphenyl)benzotriazole as an ultraviolet absorber were mixed and sufficiently kneaded with a mixing roller to prepare a third resin composition.

Thereafter, a resin film for laminated glass having a surface roughness of 20 μm was prepared in the same manner as in Example 1, except that the third resin composition was used.

Comparative Example 2

A resin film for laminated glass was prepared in the same manner as in Comparative Example 1, except that the surface thereof was treated such that the surface roughness was 95 μm.

TABLE 2

| | Resin composition used | Surface roughness at 25□ (Rz) | Thickness of each layer |
|---|---|---|---|
| Ex. 1 | First resin composition | 67 μm | 760 μm |
| Ex. 2 | First resin composition | 56 μm | 780 μm |
| Ex. 3 | First resin composition/ second resin composition/ first resin composition | 52 μm | 330 μm/ 120 μm/ 330 μm |
| C. Ex. 1 | Third resin composition | 20 μm | 760 μm |
| C. Ex. 2 | Third resin composition | 95 μm | 760 μm |

Test Example

Measurement of Physical Properties

Each laminated glass was produced by the following method using the resin films for laminated glass of Examples 1 to 3 and Comparative Examples 1 and 2, and the physical properties thereof were measured. The measurement results are shown in Table 3.

<Production of Laminated Glass>

A resin film for laminated glass was placed on a curved glass plate (with an area of 1.8 m² and a thickness of 2.1 mm) for an automobile windshield, and another curved glass plate of the same shape was placed on the resin film. Thereafter, the two curved glass plates were aligned, put in a rubber bag for degassing for 20 minutes at a vacuum of 20 torr, transferred to an oven at 90° C., and left at this temperature for 30 minutes. Thereafter, the curved glass plates were preliminarily joined using a vacuum press and subjected to thermocompression under the conditions of a pressure of 12 kg/cm² and a temperature of 135° C. in an autoclave to thereby produce transparent laminated glass.

(1) Measurement of Maximum Static Friction Coefficient

A resin film for laminated glass was placed on a horizontal SUS plate. A 65 mm×65 mm planar weight (500 g) was placed on the resin film for laminated glass. The plate was tilted, and the angle at which the weight began to slip was measured, which was converted to a friction coefficient. The friction coefficient was then converted to a tangent of the tilted angle.

(2) Measurement of Compressive Elastic Deformation Index

A resin film for laminated glass was placed on a horizontal SUS plate. A tip having a diameter of 4 mm and a flat end was placed on the resin film. Thereafter, a force was gradually applied through the tip at 35° C., and the depth of deformation was measured with respect to the applied force. The deformation depths were measured when the force was increased from 0.05 N to 0.2 N, from 0.2 N to 0.4 N, and from 0.4 N to 0.6 N.

(3) Measurement of Workability

A resin film for laminated glass was placed on a curved glass plate, and another curved glass was placed on the resin film. Then, it was determined whether or not the operator could move the curved glass of the uppermost layer with the finger force. It was also observed whether or not the aligned curved glass plates were misaligned when the aligned laminated glass was moved about 10 m on a conveyor belt.

○: The operator could move the curved glass plate with the finger force, and no misalignment was observed when the laminated glass was moved on a conveyer belt x: The operator could not move the curved glass plate with the finger force, or misalignment was observed when the laminated glass was moved on a conveyer belt (4) Bubbles ○: No bubbles were observed by the naked eyes on the finally joined laminated glass x: Bubbles were observed by the naked eyes on the finally joined laminated glass (5) Measurement of Surface Roughness (or Rz Roughness)

The surface roughness was measured using an SJ-310 model of MITUTOYO. Specifically, it was measured according to the VDA standard. Five points of a sample were measured to obtain an average thereof, wherein the sample had a cut off of 8 mm and a measured length of 16 mm.

TABLE 3

| | Compressive elastic deformation index (μm/N) (0.05 N to 0.2 N/ 0.2 N to 0.4 N/ 0.4 N to 0.6 N) | Max. static friction coefficient (20° C./ 40° C./45° C.) | Workability | Bubbles |
|---|---|---|---|---|
| Ex. 1 | 283/130/85 | 0.95/1.26/1.43 | ○ | ○ |
| Ex. 2 | 85/64/45 | 1.26/1.53/1.91 | ○ | ○ |
| Ex. 3 | 98/71/54 | 1.40/1.65/2.01 | ○ | ○ |
| C. Ex. 1 | 42/33/22 | 1.65/1.85/2.25 | x | x |
| C. Ex. 2 | 346/205/167 | 0.81/1.01/1.15 | x | ○ |

As shown in Table 3, the resin films of Examples 1 to 3 had a surface roughness, a compressive elastic deformation index, and a maximum static friction coefficient within the predetermined ranges. Accordingly, the resin films can have the effects of improved workability and removal of bubbles.

The invention claimed is:

1. A resin film for laminated glass, which comprises:
a resin layer comprising a first polyvinyl acetal resin and a plasticizer; and
a contact surface in direct contact with glass,
wherein the contact surface has an Rz roughness of 25 to 90 μm and a maximum static friction coefficient at 20° C. of 0.85 to 1.60, and
the compressive elastic deformation index defined by the following Equation 1 and measured in the perpendicular direction from the contact surface at 35° C. is 40 to 310 μm/N:

$$\text{Compressive elastic deformation index} = d/F \quad \text{Equation 1}$$

wherein F is a force of 0.05 to 0.6 N applied in the direction perpendicular to the contact surface by a tip having a flat end and a diameter of 4 mm, and d is a depth that is compressively deformed in the perpendicular direction by the tip, and wherein the first polyvinyl acetal resin is prepared from a mixture of polyvinyl alcohols that comprise 5 to 15% by weight of a polyvinyl alcohol having a degree of polymerization of 1,000 to 1,300, 70 to 85% by weight of a polyvinyl alcohol having a degree of polymerization of 1,500 to 1,900, and 8 to 25% by weight of a polyvinyl alcohol having a degree of polymerization of 2,000 to 2,500.

2. The resin film for laminated glass of claim 1, wherein the contact surface has a maximum static friction coefficient at 40° C. of 1.05 to 1.80.

3. The resin film for laminated glass of claim 1, wherein the contact surface has a maximum static friction coefficient at 45° C. of 1.20 to 2.10.

4. The resin film for laminated glass of claim 1, which has a compressive elastic deformation index of 80 to 310 μm/N when F is 0.05 to 0.2 N and a compressive elastic deformation index of 60 to 140 μm/N when F is 0.2 to 0.4 N.

5. The resin film for laminated glass of claim 1, wherein a content of OH in the first polyvinyl acetal resin is 5 to 60% by mole.

6. The resin film for laminated glass of claim 1, wherein the resin layer comprises 20 to 50 parts by weight of the plasticizer based on 100 parts by weight of the first polyvinyl acetal resin, and the plasticizer is at least one selected from the group consisting of an ester-based plasticizer and a phosphoric acid-based plasticizer.

7. The resin film for laminated glass of claim 1, wherein the thickness of the resin layer is 580 to 940 μm, and the upper and lower sides of the resin layer are in contact with glass, respectively.

8. A laminated glass, which comprises a first glass panel; the resin film for laminated glass of claim 1; and a second glass panel sequentially laminated.

9. A process for manufacturing laminated glass, which comprises:
(1) disposing the resin film for laminated glass of claim 1 on a first glass panel;
(2) disposing a second glass panel on the resin film for laminated glass; and
(3) aligning the second glass panel with respect to the first glass panel.

10. A resin film for laminated glass, which comprises a structure in which a first skin layer, an intermediate resin layer, and a second skin layer are sequentially laminated,
wherein the first skin layer and the second skin layer each comprise a first contact surface or a second contact surface in direct contact with glass,
the first skin layer and the second skin layer each comprise a first polyvinyl acetal resin and a plasticizer,
the first contact surface and the second contact surface each have an Rz roughness of 25 to 90 μm and a maximum static friction coefficient at 20° C. of 0.85 to 1.60, and
the compressive elastic deformation index defined by the following Equation 1 and measured in the perpendicular direction from each of the first contact surface and the second contact surface at 35° C. is 40 to 310 μm/N:

$$\text{Compressive elastic deformation index} = d/F \quad \text{Equation 1}$$

wherein F is a force of 0.05 to 0.6 N applied in the direction perpendicular to the contact surface by a tip having a flat end and a diameter of 4 mm, and d is a depth that is compressively deformed in the perpendicular direction by the tip, and wherein the first polyvinyl acetal resin is prepared from a mixture of polyvinyl alcohols that comprise 5 to 15% by weight of a polyvinyl alcohol having a degree of polymerization of 1,000 to 1,300, 70 to 85% by weight of a polyvinyl alcohol having a degree of polymerization of 1,500 to 1,900, and 8 to 25% by weight of a polyvinyl alcohol having a degree of polymerization of 2,000 to 2,500.

11. The resin film for laminated glass of claim 10, wherein the thicknesses of the first skin layer and the thicknesses of the second skin layer are 250 to 400 μm, respectively, and the thickness of the intermediate resin layer is 80 to 140 μm.

12. The resin film for laminated glass of claim 10, wherein the intermediate resin layer comprises a second polyvinyl acetal resin and a plasticizer, the intermediate resin layer comprises 30 to 40 parts by weight of the plasticizer based on 100 parts by weight of the second polyvinyl acetal resin, and a content of OH in the second polyvinyl acetal resin is 5 to 30% by mole.

13. A laminated glass, which comprises a first glass panel; the resin film for laminated glass of claim 10; and a second glass panel sequentially laminated.

14. A process for manufacturing laminated glass, which comprises:
  (1) disposing the resin film for laminated glass of claim 10 on a first glass panel;
  (2) disposing a second glass panel on the resin film for laminated glass; and
  (3) aligning the second glass panel with respect to the first glass panel.

* * * * *